June 17, 1930. F. L. BRONSON 1,764,432
WELL BORING BIT
Filed Feb. 24, 1925
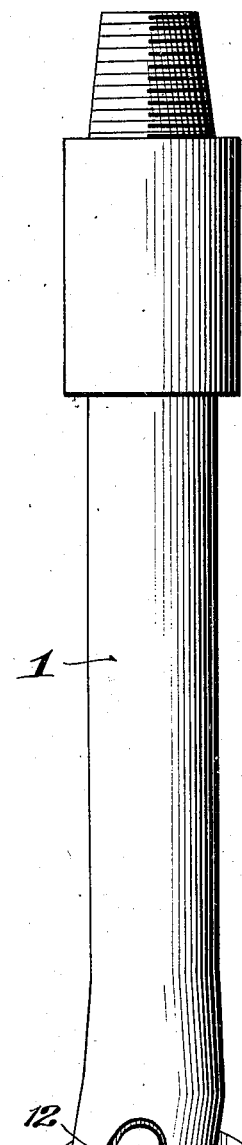
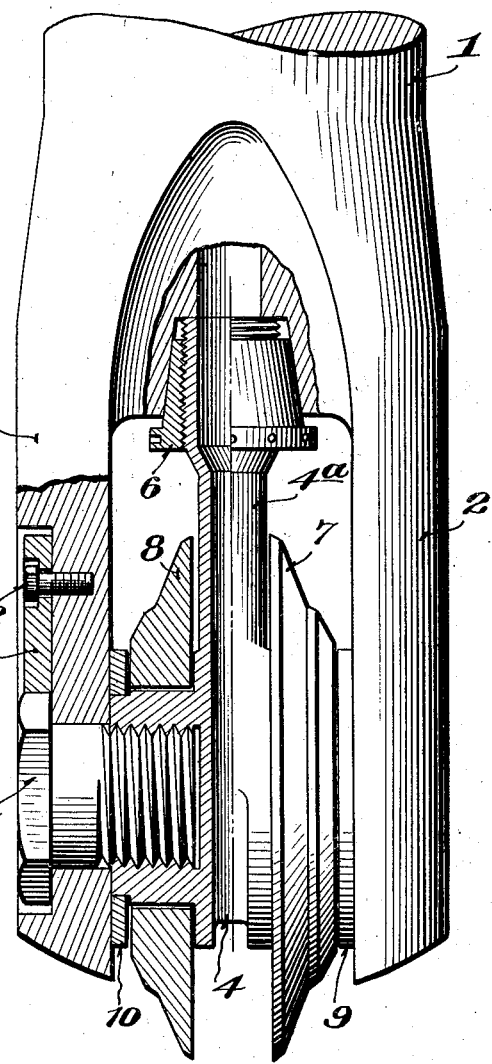
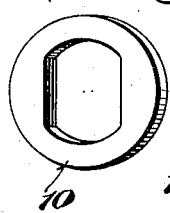
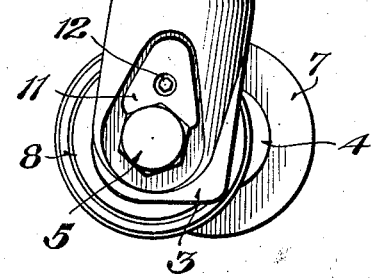
Inventor
Fred L. Bronson,
By
Attorney Patented June 17, 1930

1,764,432

UNITED STATES PATENT OFFICE

FRED L. BRONSON, OF LOS ANGELES, CALIFORNIA

WELL-BORING BIT

Application filed February 24, 1925. Serial No. 11,178.

The invention relates broadly to well boring bits and is more particularly defined as the disc type of bit.

The chief object of the invention is to provide a disc bit of rigid leg construction having economically replaceable wearing parts.

Another object of the invention is to provide means of applying water to the cutting edges of the discs.

Further objects and advantages of the invention will be apparent as the invention is more fully described.

In view of the foregoing the invention resides in the novel subject matter hereinafter described and claimed, the description being supplemented by the accompanying drawing, wherein:—

Figure 1 is a side view of the bit assembled complete.

Figure 2 is an enlarged transverse view of the bit assembly partly sectioned, illustrating the construction and manner of assembly.

Fig. 3 is a perspective view of one of the thrust washers; and

Fig. 4 is a perspective view of a bolt locking member employed in connection with the bit.

The invention comprises a shank (1) having a longitudinal aperture therethrough as shown. (2) and (3) are legs projecting downward from the lower end thereof. (4) is a connecting member disposed between the legs (2) and (3) and attached to each thereof by means of threaded pins as shown at (5). (4ª) is an upward projection of the connecting member (4). (6) is a tapered collar threaded on the projection (4ª) for the purpose of making a substantially water tight joint. It will be noted the connecting member (4) has an aperture therethrough in association with the longitudinal aperture of the shank (1) for the purpose hereinafter stated. The connecting member (4) is provided with two bearing surfaces disposed oppositely in a relative offset position adjacent the legs (2) and (3), upon which the cutting discs (7) and (8) are mounted, the pins (5) being threaded into the connecting member (4) centrally of the above mentioned bearing surfaces. (9) and (10) are thrust washers mounted on the connecting member (4) between the cutting discs and the legs to prevent wear on the legs as the discs revolve. Referring to Fig. 3, it will be noted that the thrust washers (9) and (10) have two flat surfaces internally thereof which engage corresponding flat surfaces on the connecting member (4) to prevent circumferential movement of said thrust washers.

(11) is a locking member shown in association with the pins (5) to prevent accidental loosening of the pins (5). The locking member (11) is held in place by means of the screw (12). Figure 4 of the drawing illustrates another locking member for association with a different angle of the hexagon head of the pin (5) thus permitting locking the pin (5) at different angles.

To disassemble the bit, the screws (12), the locking members (11) and the pins (5) are removed and the connecting member (4) which carries the discs (7) and (8) and the thrust washers (9) and (10) is lowered from between the legs (2) and (3) thus permitting the various parts to be removed from the connecting member (4). The bit is assembled in a similar manner which is quite obvious. Referring to Figure 1 of the drawing, it will be noted the discs (7) and (8) project beyond the opposite sides of the shank which arranges them in an offcenter position causing approximately two-fifths of the discs' circumference to contact the bottom of the hole which causes the discs to revolve thus utilizing the entire circumferential cutting edge of each disc. When in operation water is forced down through the central aperture of the shank (1) and the connecting member (4) discharging near the lower cutting edges of the discs, thus forcing the cuttings away from the said discs and floating the mud to the top of the well where it is disposed of.

It is believed that the foregoing description clearly explains the nature, operation and advantages of the invention. I desire to indicate clearly, however, that I do not limit myself to the specific construction herein shown and described and that such modifications may be included as fall within the scope of what is herein claimed.

What I claim is:—

A rotary disk bit comprising a tubular shank having a pair of legs projecting from the lower end thereof, a connecting member carried by said shank and disposed between said legs, said member being longitudinally adjustable with respect to said shank, said member also having offset laterally extending integrally formed tubular bearing arms extending to points adjacent said legs, bolts extending through each leg and threaded into said bearing arms, and a cutting disk mounted on each of said bearing surfaces.

Signed at Los Angeles, this 17th day of February, 1925.

FRED L. BRONSON.